United States Patent
Watanabe et al.

(10) Patent No.: US 8,409,519 B2
(45) Date of Patent: Apr. 2, 2013

(54) EXHAUST-GAS CONVERTING FILTER AND PRODUCTION PROCESS FOR THE SAME

(75) Inventors: Masao Watanabe, Toyota (JP); Takahiko Ido, Gifu-ken (JP)

(73) Assignees: Toyota Jidosha Kabushiki Kaisha, Toyota-shi, Aichi-ken (JP); Ibiden Co., Ltd., Ogaki-shi, Gifu-ken (JP)

( * ) Notice: Subject to any disclaimer, the term of this patent is extended or adjusted under 35 U.S.C. 154(b) by 830 days.

(21) Appl. No.: 12/574,780

(22) Filed: Oct. 7, 2009

(65) Prior Publication Data

US 2010/0061900 A1    Mar. 11, 2010

Related U.S. Application Data

(63) Continuation of application No. PCT/JP2008/057007, filed on Apr. 9, 2008.

(30) Foreign Application Priority Data

Apr. 9, 2007 (JP) ................................. 2007-101810

(51) Int. Cl.
    *B01D 50/00* (2006.01)
(52) U.S. Cl. ........................................ 422/180; 422/177
(58) Field of Classification Search .................. 422/177, 422/180; 428/116; 55/523
See application file for complete search history.

(56) References Cited

U.S. PATENT DOCUMENTS

| | | | |
|---|---|---|---|
| 8,226,898 B2 * | 7/2012 | Miwa et al. | 422/180 |
| 2006/0096276 A1 * | 5/2006 | Goralski et al. | 60/286 |
| 2006/0100098 A1 * | 5/2006 | Ura et al. | 502/325 |
| 2006/0292342 A1 * | 12/2006 | Ohno et al. | 428/116 |
| 2009/0246098 A1 * | 10/2009 | Endo et al. | 422/180 |

FOREIGN PATENT DOCUMENTS

| | | |
|---|---|---|
| EP | 0 766 993 | 4/1997 |
| JP | 7-106290 | 11/1995 |
| JP | 9-57066 | 3/1997 |
| JP | 9-94434 | 4/1997 |
| JP | 9-125931 | 5/1997 |
| JP | 2000-176286 | 6/2000 |
| JP | 2001-207836 | 8/2001 |
| JP | 2002-4844 | 1/2002 |
| JP | 2007-313477 | 12/2007 |
| WO | WO 93/12863 | 7/1993 |

OTHER PUBLICATIONS

Extended European Search Report for EP Appl. No. 08740110.5 dated Jan. 31, 2011.

* cited by examiner

Primary Examiner — Tom Duong
(74) Attorney, Agent, or Firm — Finnegan, Henderson, Farabow, Garrett & Dunner, LLP

(57) ABSTRACT

An outlet-side catalytic layer 22 includes a noble metal in a concentration that is a noble-metal concentration in an inlet-side catalytic layer 20 or more, and the inlet-side catalytic layer 20 contains an $NO_x$ storage material in a content that is greater than that in the outlet-side catalytic layer 22 in the inlet-side catalytic layer 20, a pore catalytic layer 21 and the outlet-side catalytic layer 22. PM are converted on the inlet side mainly, and $NO_x$ are converted on the outlet side mainly. Therefore, the lowering of the noble metal's activities is suppressed, and additionally it is possible to convert PM and $NO_x$ efficiently.

6 Claims, 2 Drawing Sheets

EXHAUST-GAS CONVERTING FILTER AND PRODUCTION PROCESS FOR THE SAME

This is a continuation of PCT application PCT/JP2008/057007 filed Apr. 9, 2008, which in turn is based on Japanese application 2007-101810 filed Apr. 9, 2007, the entire contents of each of which is incorporated herein by reference.

TECHNICAL FIELD

The present invention relates to an exhaust-gas converting filter, which can convert particulate matters (i.e., PM) and $NO_x$ that are included in diesel exhaust gases, and the like, efficiently.

BACKGROUND ART

Regarding gasoline engines, the harmful components in the exhaust gases have been decreasing securely by means of the strengthening of automotive exhaust-gas regulations and the developments of technologies that can cope with them. On the other hand, regarding diesel engines, the conversion of the exhaust gases is more difficult than in the case of gasoline engines, because of such an usual circumstance that the harmful components have been emitted as PM (i.e., carbon fine particles, sulfur-system fine particles such as sulfates, and high-molecular-weight hydrocarbon particulates (or SOF), and the like).

Hence, mesh-closed type honeycomb bodies (or diesel particulate filters (hereinafter, being referred to as "DPF")), which are made of ceramic, have been known heretofore. The DPF is one which is completed by closing meshes at the opposite ends of the cellular openings of a ceramic honeycomb structural body alternately in a checkered manner, for instance. It comprises; inlet-side cells that are mesh plugged on the exhaust-gas downstream side; outlet-side cells that neighbor the inlet-side cells and are mesh plugged on the exhaust-gas upstream side, and porous cellular partition walls that demarcate the inlet-side cells and the outlet-side cells; and captures PM by filtering exhaust gases with the pores in the cellular partition walls.

Moreover, as set forth in Japanese Examined Patent Publication (KOKOKU) Gazette No. 7-106,290, a filter catalyst has been developed recently, filter catalyst in which a catalytic layer that is completed by supporting a catalytic metal, such as platinum (Pt), onto alumina, or the like, is formed on the surface of the cellular partition walls of DPF. In accordance with this filer catalyst, since captured PM are oxidized and then burned by means of the catalytic metal's catalytic reactions, it is possible to continuously recover the filter catalyst by letting them burn simultaneously with their capture, or in succession to their capture.

Further, in Japanese Unexamined Patent Publication (KOKAI) Gazette No. 9-94,434, there is set forth a filter catalyst in which a catalytic layer is formed not only on the cellular partition walls but also within the pores in the cellular partition walls. By forming a catalytic layer within the pores as well, the contact probability between PM and catalytic metal is enhanced, and thereby it is possible to burn PM, which have been captured within the pores, by means of oxidation. Moreover, in the catalytic layer, NO in exhaust gases is oxidized to generated $NO_2$ with high oxidizing activity, and thereby the oxidation reactions of PM by means of this $NO_2$ are also expected.

And, in Japanese Unexamined Patent Publication (KOKAI) Gazette No. 9-125,931, there is set forth a filter catalyst in which a noble metal, and an $NO_x$ storage material are contained without ever forming any coating layer. By thus containing a noble metal and an $NO_x$ storage material, it is possible to store $NO_x$ in lean atmosphere, and it is possible to release stored $NO_x$ by turning the lean atmosphere into rich atmosphere intermittently and then convert them by means of reduction. Therefore, it is possible to convert PM and $NO_x$ in exhaust gases efficiently.

However, since a reducing agent that is supplied in rich atmosphere is consumed at first on the upstream side of filter catalyst, a concentration distribution arises between the upstream side and the downstream side, or between the inlet-side cells and the outlet-side cells. Therefore, in a filter catalyst on which an $NO_x$ storage material is supported uniformly, a distribution arises in the reaction magnitude of $NO_x$ with the reducing agent on the $NO_x$ storage material, and accordingly no efficient $NO_x$ conversion can be done. Specifically, such circumstances occur that: although the $NO_x$-storage-material amount is great, the reducing agent is less; on the contrary, although the $NO_x$-storage-material amount is less, the reducing agent is great.

Hence, in Japanese Unexamined Patent Publication (KOKAI) Gazette No. 2001-207,836, there is proposed a filter catalyst on which a supporting amount of a catalytic substance is distributed greatly on the inlet side without ever forming any coating layer. In accordance with the filter catalyst set forth in this gazette, it is possible to carry out the conversion of exhaust gas more actively on the inlet side, where the concentrations of harmful substances such as PM are high, by distributing a supporting amount of a noble metal greatly on the inlet side. Moreover, it is possible to carry out the $NO_x$ reduction conversion with high $NO_x$ reduction conversion efficiency in a well-balanced manner as a whole by distributing a supporting amount of an $NO_x$ storage material greatly on the inlet side where the concentration of a reducing agent is high.

In order to improve an $NO_x$ conversion ratio by making an $NO_x$ storing amount greater, it is required that an $NO_x$ storage material be supported greatly. However, when having a filter substrate directly contain an $NO_x$ storage material greatly without forming any coating layer, such a case often arises that the reaction between the $NO_x$ storage material and the substrate has occurred, and thereby it is not possible to have it contain a required amount of the $NO_x$ storage material. Moreover, there is also such a problem that the activity is low, compared with a filter catalyst in which a catalytic layer on which a catalytic component is supported is formed on a coating layer that comprises a porous support such as alumina.

Patent Literature No. 1: Japanese Examined Patent Publication (KOKOKU) Gazette No. 7-106,290;
Patent Literature No. 2: Japanese Unexamined Patent Publication (KOKAI) Gazette No. 9-94,434;
Patent Literature No. 3: Japanese Unexamined Patent Publication (KOKAI) Gazette No. 9-125,931; and
Patent Literature No. 4: Japanese Unexamined Patent Publication (KOKAI) Gazette No. 2001-207,836

DISCLOSURE OF THE INVENTION

Assignment to be Solved by the Invention

Hence, it is possible to think of applying the technology that is set forth in Japanese Unexamined Patent Publication (KOKAI) Gazette No. 2001-207,836 to a filter catalyst with a catalytic layer being formed. In a filter catalyst, however, the pressure loss rises when the coating amount of a catalytic layer becomes greater because the catalytic layer is also formed within the pores of the cellular partition walls. Accordingly, it cannot help make the forming amount of the catalytic layer less, compared with that on a flow-through structure monolithic catalyst. Consequently, as a result of the amount of a porous support such as alumina becoming less, the containing density of a noble metal or $NO_x$ storage material becomes high.

Therefore, in a filter catalyst with a catalytic layer being formed, there is also such a drawback that the granular growth of a noble metal occurs on the inlet side in the case of making the contents of a noble metal and $NO_x$ storage material greater on the inlet side. Moreover, since the noble metal is covered with the $NO_x$ storage material, there is even such a problem that the activity of the noble metal lowers. Further, since the content of the noble metal is less on the outlet side, $NO_x$, which have been released from the $NO_x$ storage material that is contained in a great amount on the inlet side, cannot be reduced fully, and accordingly there is even such a drawback that the excessive $NO_x$ have been discharged.

The present invention is one which has been done in view of the aforementioned circumstances, and it is an assignment to be solved to adapt a filter catalyst into one in which the lowering of the activity of noble metal is suppressed, and additionally which can convert PM and $NO_x$ efficiently.

Means for Solving the Assignment

A characteristic of a filter catalyst according to the present invention which solves the aforementioned assignment lies in that it is an exhaust-gas converting filter comprising:

a wall-flow structure filer substrate having inlet-side cells being mesh plugged on the exhaust-gas downstream side, outlet-side cells neighboring the inlet-side cells and being mesh plugged on the exhaust-gas upstream side, and porous cellular partition walls demarcating the inlet-side cells and the outlet-side cells and having a large number of pores;

an inlet-side catalytic layer being formed on a surface on a side of the inlet-side cells of the cellular partition walls;

an outlet-side catalytic layer being formed on a surface on a side of the outlet-side cells of the cellular partition walls; and pore catalytic layer being formed on the pores within the cellular partition walls;

and in that:

a noble metal is included in the outlet-side catalytic layer in a concentration that is a noble-metal concentration in the inlet-side catalytic layer or more; and an $NO_x$ storage material, which is selected from the group consisting of alkali metals and alkaline-earth metals, is included in the inlet-side catalytic layer, in the pore catalytic layer and in the outlet-side catalytic layer, and a content of the $NO_x$ storage material in the inlet-side catalytic layer is greater than that in the outlet-side catalytic layer.

Moreover, a characteristic of a production process for filter catalyst according to the present invention lies in that it includes:

a coating-layer forming step of forming a coating layer, which comprises a porous oxide, onto the surface on a side of the inlet-side cells of the cellular partition walls, onto the surface on a side of the outlet-side cells of the cellular partition walls, and onto the pores; and a drying step of drying the coating layer after impregnating it with a solution in which ions of an element that is selected from the group consisting of alkali metals and alkaline-earth metals are dissolved; and the drying step being carried out by blowing hot air from the inlet-side cells toward the outlet-side cells.

Effect of the Invention

In the exhaust-gas converting filter according to the present invention, the content of an $NO_x$ storage material is greater on the inlet side, and is less on the outlet side. Therefore, in the same manner as Japanese Unexamined Patent Publication (KOKAI) Gazette No. 2001-207,836, the $NO_x$ reducing efficiency is high on the inlet side where a reducing-agent concentration is high at the time of rich, and accordingly it is possible to carry out well-balanced $NO_x$ reduction conversion as a whole. In this case, since the concentration of an $NO_x$ storage material is high on the inlet side, such a problem that the activity of a noble metal lowers is inevitable. However, since the content of an $NO_x$ storage material is less on the outlet side, the activity lowering of a noble metal is suppressed.

Moreover, it has become apparent that it is feasible for potassium proper to oxidize PM from 300° C. approximately. Therefore, when using potassium as an $NO_x$ storage material, it is possible to oxidize PM by heightening an inlet-side potassium concentration, even if the inlet-side noble-metal content is less, or even if no noble metal is contained on the inlet side. Since PM are captured onto the inlet side greatly, having potassium contained greatly on the inlet side is extremely effective for the conversion of PM by means of oxidation.

And, $NO_x$, which have been released from an $NO_x$ storage material that exists at the time of supplying a reducing agent, flow onto the outlet side, and are then reduced and converted with the reducing agent by means of the catalytic action of a noble metal, which is contained greatly on the outlet side and whose activity lowering is prevented.

Further, as a result of capturing sulfur oxides, which are included in exhaust gases, onto an $NO_x$ storage material that is contained greatly on the inlet side, the sulfur poisoning of an $NO_x$ storage material on the outlet side is suppressed, and thereby it is possible to suppress the lowering of $NO_x$-converting capability, lowering which results from the sulfur poisoning.

Specifically, in accordance with the filter catalyst according to the present invention, PM are converted on the inlet side mainly, and $NO_x$ are converted on the outlet side mainly. Since the functions are thus separated within one filter catalyst, it is possible to demonstrate the respective functions maximally, it is possible to suppress the lowering of the noble metal's activities, and additionally it is possible to convert PM and $NO_x$ efficiently.

Moreover, in accordance with the production process for exhaust-gas converting filter according to the present invention, a coating layer is dried by blowing hot air from the inlet-side cells toward the outlet-side cells after impregnating it with a solution in which ions of an $NO_x$ storage element are dissolved. At the time of this drying, although the coating layer dries starting at a surface of the inlet-side coating layer that is formed on a surface of the inlet-side cells, such a phenomenon occurs that the solution, which is included inside the inlet-side coating layer, in the pore coating layer and in the outlet-side coating layer, migrates to the dried parts. Consequently, the ions of the $NO_x$ storage element that dissolve in the solution also migrate to the dried parts along with the solution. Therefore, in the $NO_x$-storage-material content, such a distribution arises that it is greater in the inlet-side catalytic layer than that in the outlet-side catalytic layer, and thereby it is possible to produce a filter catalyst according to the present invention with ease.

EXPLANATION ON REFERENCE NUMERALS

Figure 1:
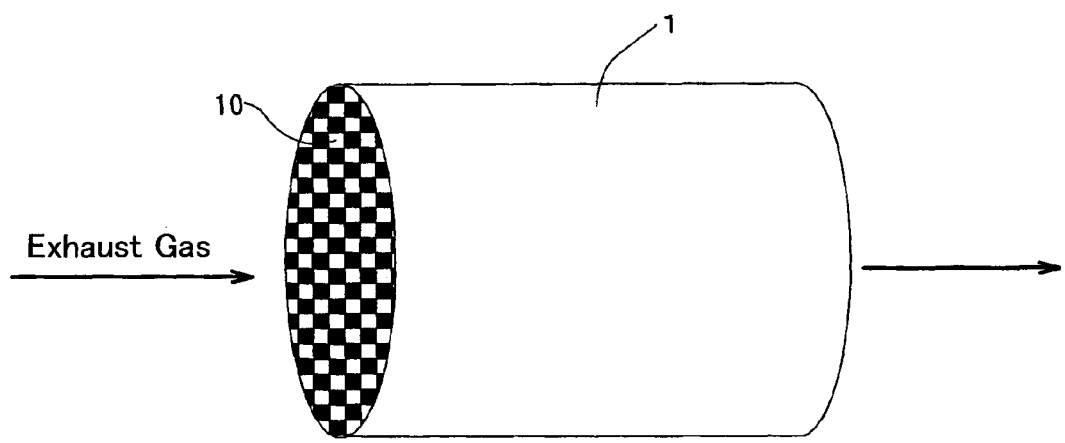
FIG. 1 is a perspective view of an exhaust-gas converting filter that is directed to an example according to the present invention.

1: Filter Substrate; 10: Inlet-side Cells; 11: Outlet-side Cells;
12: Cellular Partition Walls; 13: Pores; 20: Inlet-side Catalytic Layer;
21: Pore Catalytic Layer; and 22; Outlet-side Catalytic Layer

BEST MODE FOR CARRYING OUT THE INVENTION

An exhaust-gas converting filter according to the present invention comprises a honeycomb-configured filter substrate, and a catalytic layer being formed on the filter substrate's cellular partition walls. Of these, the filter substrate is one with a wall-flow structure, one which possesses inlet-side cells being mesh plugged on the exhaust-gas downstream side, outlet-side cells neighboring the inlet-side cells and being mesh plugged on the exhaust-gas upstream side, and porous cellular partition walls demarcating the inlet-side cells and the outlet-side cells and having a large number of pores, and one which is the same as conventional DPF.

The filter substrate can not only be formed of metallic foams, heat-resistant nonwoven fabrics, and the like, but also be produced from heat-resistant ceramic such as cordierite and silicon carbide. For example, in the case of producing it from heat-resistant ceramic, a clay-like slurry whose major component is a cordierite powder is prepared, and it is molded by extrusion molding, and so forth, and then it is calcined. Instead of the cordierite powder, it is possible as well to compound the respective powders of alumina, magnesia and silica so as to make a cordierite composition. Thereafter, the cellular openings in one of the opposite end surfaces are mesh closed in a checkered manner, or the like, with a similar clay-like slurry, or the like, and the cellular opening of the cells, which neighbor the cells that are mesh closed at the one of the opposite end surfaces, are mesh closed at the other one of the opposite end surfaces. Thereafter, by fixing the mesh-closing material by means of calcination, it is possible to produce a honeycomb-structured filter substrate. The configurations of the inlet-side cells and outlet-side cells can be cross-sectionally triangular shapes, cross-sectionally quadrangular shapes, cross-sectionally hexagonal shapes, cross-sectionally circular shapes, and so on, and are not limited especially.

Moreover, instead of cordierite, it is preferable as well to use a filter substrate that is formed of alumina, or silicon carbide or silicon nitride, or the like. There might be such a case that cordierite reacts with an $NO_x$ storage material, and accordingly there might be such a drawback that the strength lowers when such a reaction occurs. It is for this reason that such a drawback is avoidable when using a filter substrate that is formed of alumina, or the like, a material that does not react with $NO_x$ storage materials.

The cellular partition walls have a porous structure through which exhaust gases can pass. In order to form pores in the cellular partition walls, it is possible to form pores by mixing a combustible powder or the like, such as a carbon powder, a wood powder, starch and a resinous powder, into the aforementioned slurry in advance and then letting the combustible powder disappear at the time of calcination, and it is possible to control the diameters and pore volumes of the resulting pores by adjusting the particle diameter and addition amount of the combustible powder. The inlet-side cells, and the outlet-cells are communicated with each other by means of these pores, and then PMs are captured within the pores but gases become passable from the inlet-side cells to the outlet-side cells.

It is desirable that the porosity of the cellular partition walls can be 40-70%, and it is desirable that an average pore diameter can be 10-40 μm. Because of the porosity and average pore diameter that fall in these ranges, it is possible to suppress the rise of pressure loss even when the catalytic layers are formed greatly in an amount of 100-200 g/L, and it is possible to furthermore suppress the lowering of strength. And, it is possible to capture PM more efficiently.

The catalytic layers are constituted of: an inlet-side catalytic layer that is formed on a surface on a side of the inlet-side cells of the cellular partition walls; an outlet-side catalytic layer that is formed on a surface on a side of the outlet-side cells of the cellular partition walls; and a pore catalytic layer that is formed on the pores within the cellular partition walls. These catalytic layers comprise: a support that comprises a porous oxide which is selected from the group consisting of alumina, titania, zirconia and ceria, or a member of composite oxides that comprise a plurality of species being selected from these or mixtures thereof, or the like; and a catalytic substance that is included in this support. It is possible to form these catalytic layers in an amount of 100-200 g per 1-liter volume of the filter substrate, as a sum of their total. The forming amount of the catalytic layers that is greater than 200 g/L is not preferable, because the pressure loss rises; and being less than 100 g/L is not preferable, because the granular growth of a noble metal becomes noticeable when having it contained in a predetermined amount in that case.

In the outlet-side catalytic layer, a noble metal is included in a concentration that is a noble-metal concentration in the inlet-side catalytic layer or more. As for this noble metal, although Pt (platinum) whose oxidizing activity is high is especially preferable, it is even allowable to contain the other noble metal, such as Pd (palladium) and Rh (rhodium). In the inlet-side catalytic layer or pore catalytic layer, although no noble metal is essential, it is even possible to let it contain a noble metal in the same concentration or less as that in the outlet-side catalytic layer. Moreover, it is also preferable to have a noble metal contained so as to make the concentration higher from the inlet-side catalytic layer toward the pore catalytic layer and outlet-side catalytic layer. It is preferable to set the content of a noble metal to a range of 0.1-5.0 g per 1-liter of the filter substrate, as a sum of its total. When the content is less than this, the activities are too low to be practical; and the activities saturate and additionally the cost has gone up even when containing it greater than this range.

Note that, in order to have the catalytic layers contain a noble metal, it is possible to have them contain it by forming a coating layer from a porous oxide onto the cellular partition walls in advance and then by means of adsorption supporting method, impregnation supporting method, or the like, using a solution in which a nitrate of noble metal is dissolved. Alternatively, it is allowable as well to form the catalytic layers onto the cellular partition walls by loading a noble metal onto an alumina powder, or the like, in advance and then using that catalytic powder.

In the inlet-side catalytic layer, pore catalytic layer and outlet-side catalytic layer, an $NO_x$ storage material that is selected from the group consisting of alkali metals and alkaline-earth metals is included. As for the alkali metals, it is preferable to use at least one member that is selected from the group consisting of K (potassium), Na (sodium), Cs (cesium), Li (lithium), and the like; and K (potassium) is especially preferable. It is because K (potassium) has the property of oxidizing PM at 300° C. or more. Moreover, as for the alkaline-earth metals, it is preferable to use at least one member that is selected from the group consisting of Ba (barium), Sr (strontium) and Mg (magnesium), and so forth.

In the exhaust-gas converting filter according to the present invention, the content of an $NO_x$ storage material is greater in the inlet-side catalytic layer than that in the outlet-side catalytic layer. As far as this condition is satisfied, although the difference between the $NO_x$-storage-material contents is not limited in particular, it is preferable to form a content difference of 1.5 times or more between the inlet-side catalytic layer and the outlet-side catalytic layer. For example, it is preferable to set a ratio of the content in the inlet-side catalytic layer to the content in the outlet-side catalytic layer to fall in a range of 2:1-10:1. When this content difference is less than 1.5 times, the advantages of the present invention are less likely to be effected; and the activities of a noble metal on the inlet-side might sometimes lower when it becomes more than 10 times.

It is preferable that the $NO_x$-storage-material content can fall in a range of 0.3 mol-1.0 mol per 1-liter volume of the filter substrate as a whole. Moreover, it is preferable to contain an $NO_x$ storage material in an amount of 0.2 mol-1.0 mol per 1-liter volume of the filter substrate in the inlet-side catalytic layer, and it is preferable to contain an $NO_x$ storage material in an amount of 0.01 mol-0.3 mol per 1-liter volume of the filter substrate in the outlet-side catalytic layer.

In particular, in a case where K (potassium) is used as an $NO_x$ storage material, it is preferable to be 0.2 mol or more per 1-liter volume of the support substrate in the inlet-side catalytic layer, and it is necessary to control it to 0.05 mol or less per 1-liter volume of the support substrate in the outlet-side catalytic layer.

It is allowable that an $NO_x$-storage-material content in the pore catalytic layer can be an equal amount to that in the inlet-side catalytic layer, or to that in the outlet-side catalytic layer; alternatively, it is even allowable to make a gradient composition in which the $NO_x$-storage-material content lowers from the inlet-side catalytic layer toward the pore catalytic layer and outlet-side catalytic layer.

In order to have the catalytic layers contain an $NO_x$ storage material, the following can be carried out: a coating layer, which has been formed on the cellular partition walls in advance, is dried and then calcined after it is impregnated with an aqueous solution of alkali-metal salt or alkaline-earth-metal salt, and the like. In order to make the contents different between the inlet-side catalytic layer and the outlet-side catalytic layer, it is preferable to utilize the production process according to the present invention, though it is even allowable to impregnate the coating layer using each of the solutions with different concentrations for each of them.

Specifically, it includes; a coating-layer forming step of forming a coating layer, which comprises a porous oxide, onto the surface on a side of the inlet-side cells of the cellular partition walls, onto the surface on a side of the outlet-side cells of the cellular partition walls, and onto the pores; and a drying step of drying the coating layer after impregnating it with a solution in which ions of an $NO_x$ storage material are dissolved; and the drying step is carried out by blowing hot air from the inlet-side cells toward the outlet-side cells.

In accordance with this production process, although the coating layer dries starting at a surface of the inlet-side coating layer that is formed on a surface of the inlet-side cells, such a phenomenon occurs that the solution, which is included inside the inlet-side coating layer, in the pore coating layer and in the outlet-side coating layer, migrates to the dried parts. Consequently, the ions of the $NO_x$ storage element that dissolve in the solution also migrate to the dried parts along with the solution. Therefore, in the $NO_x$-storage-material content, such a distribution arises that it is greater in the inlet-side catalytic layer than that in the outlet-side catalytic layer, and thereby it is possible to produce a filter catalyst according to the present invention with ease.

It is desirable that a temperature of the hot air can fall in a range of 80° C.-130° C. When it is lower temperatures than 80° C., the $NO_x$-storage-material concentration difference between the inlet side and the outlet side becomes small; and the effect saturates even when making it higher than 130° C.

EXAMPLES

Hereinafter, the present invention will be explained concretely by means of examples and comparative examples.

Example No. 1

Figure 2:
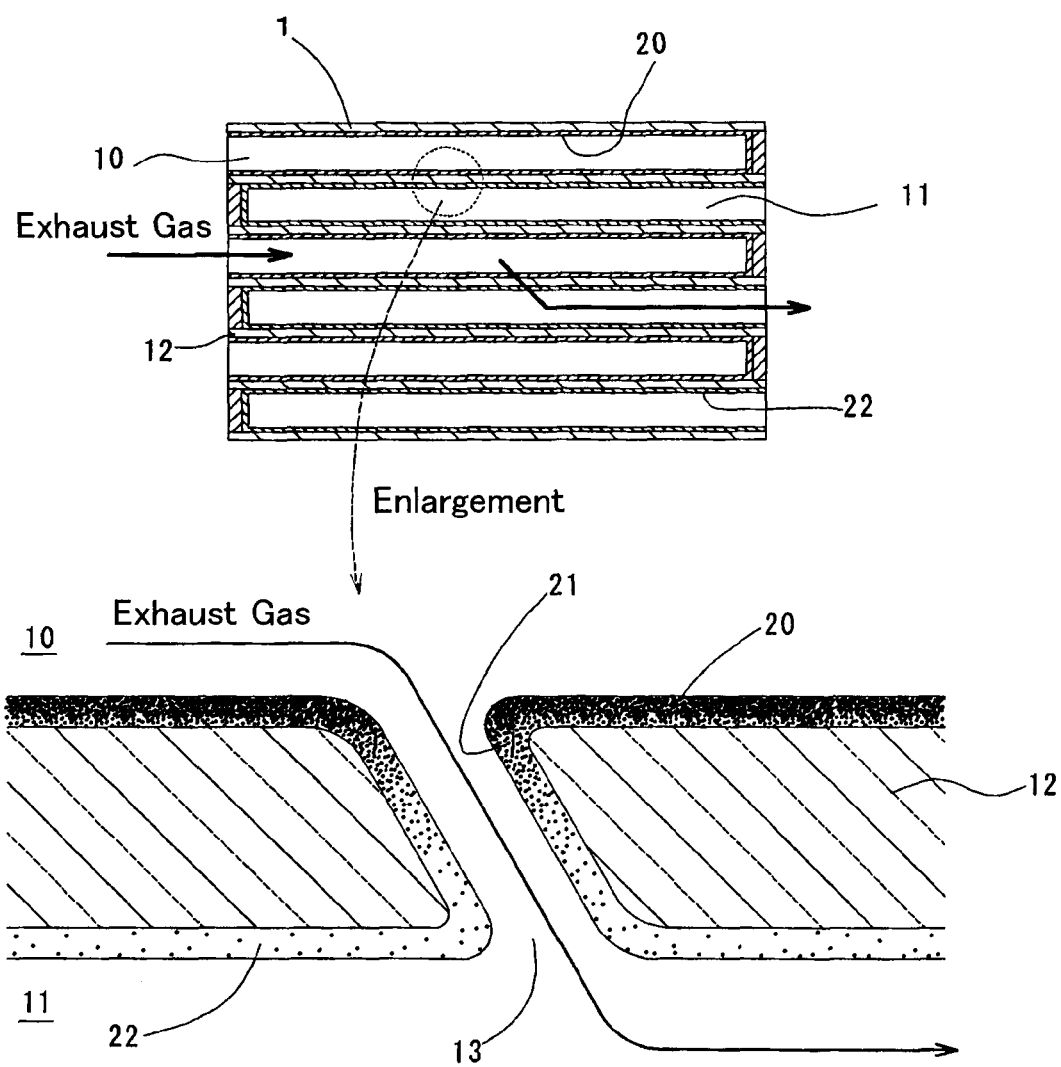
FIG. 2 is a cross-sectional diagram of an exhaust-gas converting filter that is directed to an example according the present invention, and another cross-sectional diagram with its major section being enlarged.

In FIG. 1 and FIG. 2, schematic diagrams of an exhaust-gas converting filter according to the present example are illustrated. In this exhaust-gas converting filter, a filter substrate 1 is adapted into a substrate, filter substrate 1 which comprises: inlet-side cells 10 being mesh plugged on the exhaust-gas downstream side; outlet-side cells 11 neighboring the inlet-side cells 10 and being mesh plugged on the exhaust-gas upstream side; and cellular partition walls 12 demarcating the inlet-side cells 10 and the outlet-side cells 11. Inside the cellular partition walls 12, pores 13, which communicate the inlet-side cells 10 with the outlet-side cells 11, are formed.

An inlet-side catalytic layer 20 is formed on a surface on a side of the inlet-side cells 10 of the cellular partition walls 12; a pore catalytic layer 21 is formed on an inner surface of the pores 13 of the cellular partition walls 12; and an outlet-side catalytic layer 22 is formed on a surface on a side of the outlet-side cells 11 of the cellular partition walls 12.

Hereinafter, a production process for the respective catalytic layers will be explained instead of detailed explanations on the construction of the exhaust-gas converting filter.

A filter substrate 1 (wall-flow structure, and 12 mil/300 cpsi), whose diameter was 130 mm and length was 150 mm and which was made of cordierite, was made ready. Next, a $\gamma$-$Al_2O_3$ (alumina) powder, a $TiO_2$ (titania) powder, and a $ZrO_2$ (zirconia) powder were mixed together with alumina sol and ion-exchanged water so that the resulting viscosity became 100 cps or less to prepare a slurry, and were subjected to milling so that an average particulate diameter of the solid particles became 1 μm or less. And, the aforementioned filter substrate 1 was immersed into this slurry to let the slurry run into the inside of the cells, was taken up therefrom, was suctioned through an end surface that was opposite to the immersed side to remove the slurry in excess, and was calcined at 600° C. for 2 hours after drying it by blowing hot air thereto at 120° C., for 2 hours. These operations were repeated twice in order to adjust so that a coating layer was formed in a substantially equal amount on the inlet-side cells, and on the outlet-side cells 11, respectively. The forming amount of the coating layer was 100 g per 1-liter volume of the filter catalyst 1.

Next, a predetermined amount of a dinitrodiammine platinum aqueous solution with a predetermined concentration was suction absorbed into the entirety of the coating layer, and then a ventilation drying was done at 120° C. for 2 hours after drying it by blowing warm air thereto at 60° C., thereby supporting Pt (platinum) thereon. Moreover, using a palladium nitrate aqueous solution and a rhodium nitrate aqueous solution, Rh (rhodium) and palladium (Pd) were supported, respectively, in the same manner. The supporting amount per 1-liter volume of the filter substrate 1 was 2 g for Pt (platinum), 1 g for Pd (palladium), and 0.5 g for Rh (rhodium).

Next, a mixture aqueous solution, in which barium acetate, potassium acetate and lithium acetate were dissolved in a predetermined concentration respectively, was made ready; then the aforementioned filter substrate 1 with the noble metals being supported was immersed into it for 2 minutes, was taken up therefrom, and was dried rapidly by distributing air that was heated to 120° C. from the inlet-side cells 10 to the outlet-side cells 11 at a flow rate of 3 m/sec. for 10 minutes after blowing off the excessive aqueous solution. Thereafter, it was calcined in air at 200° C. for 2 hours. By means of this, in the coating layer, Ba (barium) was supported in an amount of 0.2 mol; K (potassium) was supported in amount of 0.4 mol; and Li (lithium) was supported in an amount of 0.4 mol; per 1-liter volume of the support substrate 1 by a summed value of their entirety, respectively.

Upon subjecting the obtained exhaust-gas converting filter to an EPMA analysis, an amount of Ba (barium), which quadrupled that in the outlet-side catalytic layer 22, an amount of K (potassium), which quadrupled that in the outlet-side catalytic layer 22, and an amount of Li (lithium), which quadrupled that in the outlet-side catalytic layer 22, were observed in the inlet-side catalytic layer 20, respectively. Note that the pore catalytic layer 21 made a gradient composition that decreased from the inlet-side catalytic layer 20 toward the outlet-side catalytic layer 22 when taking their concentrations in the superficial layer of the inlet-side catalytic layer 20, and their concentrations in the inner layer of the outlet-side catalytic layer 22 as their maximums and minimums, respectively.

Example No. 2

Except that a filter substrate (12 mil/300 cpsi), whose diameter was 130 mm and length was 150 mm and which was made of active alumina was used instead of the filter substrate that was made of cordierite, an exhaust-gas converting filter according to Example No. 2 was prepared in the same manner as Example No. 1.

Upon subjecting the obtained exhaust-gas converting filter to an EPMA analysis, an amount of Ba (barium), which quintupled that in the outlet-side catalytic layer 22, an amount of K (potassium), which quintupled that in the outlet-side catalytic layer 22, and an amount of Li (lithium), which quintupled that in the outlet-side catalytic layer 22, were observed in the inlet-side catalytic layer 20, respectively. Note that the pore catalytic layer 21 made a gradient composition that decreased from the inlet-side catalytic layer 20 toward the outlet-side catalytic layer 22 when taking their concentrations in the inlet-side catalytic layer 20, and their concentrations in the outlet-side catalytic layer 22 as their maximums and minimums, respectively.

Comparative Example No. 1

In the same manner as Example No. 1, the respective noble metals were supported onto the filter substrate 1 with the coating layer being formed in the same amounts as those in Example No. 1. Next, a mixture aqueous solution, in which barium acetate, potassium acetate and lithium acetate were dissolved in a predetermined amount respectively, was made ready; then the aforementioned filter substrate 1 with the noble metals being supported was immersed into it for 2 minutes, was taken up therefrom, was dried in a microwave drier, and was then calcined in air at 600° C. for 2 hours. By means of this, in the coating layer, Ba (barium) was supported in an amount of 0.2 mol; K (potassium) was supported in amount of 0.4 mol; and Li (lithium) was supported in an amount of 0.4 mol; per 1-liter volume of the support substrate 1 by a summed value of their entirety, respectively.

Upon subjecting the obtained exhaust-gas converting filter to an EPMA analysis, it was observed that Ba (barium), K (potassium) and Li (lithium) were supported uniformly in all of the inlet-side catalytic layer 20, pore catalytic layer 21 and outlet-side catalytic layer 22.

Comparative Example No. 2

Except that the same filter substrate as that of Example No. 2 was used instead of the filter substrate that was made of cordierite, an exhaust-gas converting filter according to Comparative Example No. 2 was prepared in the same manner as Comparative Example No. 1.

Upon subjecting the obtained exhaust-gas converting filter to an EPMA analysis, it was observed that Ba (barium), K (potassium) and Li (lithium) were supported uniformly in all of the inlet-side catalytic layer 20, pore catalytic layer 21 and outlet-side catalytic layer 22.

<Test-Evaluation>

The exhaust-gas converting filters according to examples and comparative examples were cut out into a test piece whose diameter was 30 mm and length was 50 mm (35 c.c.), and were put in place in an evaluating apparatus, respectively. And, the following were repeated alternately: a lean gas given in Table 1 was distributed for 55 seconds; and thereafter a rich gas given in the Table 1 was distributed for 5 seconds, and subsequently their $NO_x$ storing amounts were measured after being switched to lean. It was carried out at two levels of the catalytic-bed temperature, at 300° C. and at 450° C., and the flow volume of the gases was 20 L/min., respectively. The results are given in relative proportions with respect to the $NO_x$ storing amount of Comparative Example No. 1.

TABLE 1

|  | $C_3H_6$ | $O_2$ | NO | $CO_2$ | $H_2O$ | $N_2$ |
|---|---|---|---|---|---|---|
| Rich | 1% C | 1% | 200 ppm | 10% | 10% | Balance |
| Lean | 500 ppmC | 10% | 200 ppm | 10% | 10% | Balance |

Moreover, the exhaust-gas converting filters according to examples and comparative examples were fitted into an exhaust system of a 2.2-L engine, and PM were captured so as to be equivalent to 2 g/L under the following conditions: 2,000 rpm; 30 Nm; and 210-° C. inlet-gas temperature. These were cut out to the test-piece size, and were put in place in an evaluating apparatus, and the catalytic-bed temperature was thereafter raised from room temperature to 600° C. at a rate of 10° C./min. in the lean gas given in Table 1. Temperatures at which the oxidation reactions of PM being captured on this occasion started were measured, and the results are given in Table 2.

TABLE 2

| | Substrate | NO$_x$-storage-material Content Ratio (Inlet Side/Outlet Side) | PM-oxidation Starting Temp. (° C.) | NO$_x$-storing-amount Ratio | |
|---|---|---|---|---|---|
| | | | | 300° C. | 450° C. |
| Ex. No. 1 | Cordierite | About 4/1 | 325 | 3.2 | 2.1 |
| Comp. Ex. No. 1 | Cordierite | 1/1 | 450 | 1.0 | 1.0 |
| Ex. No. 2 | Alumina | About 5/1 | 320 | 4.5 | 3.3 |
| Comp. Ex. No. 2 | Alumina | 1/1 | 410 | 0.7 | 1.7 |

From Table 2, it is understood that, in Example No. 1 and Example No. 2, their NO$_x$ storing amounts were great, compared with those in corresponding Comparative Example No. 1 and Comparative Example No. 2; and that PM were burned from low-temperature region. It is apparent that these were advantages that resulted from making the NO$_x$-storage-material content in the inlet-side catalytic layer greater than that in the outlet-side catalytic layer.

Moreover, it is apparent from the comparison between Example No. 1 and Example No. 2 that the greater the difference between the NO$_x$-storage-material contents was the greater the NO$_x$ storing amount was and the lower the PM-combustion starting temperature was.

The invention claimed is:

1. An exhaust-gas converting filter comprising:
   a wall-flow structure filer substrate having inlet-side cells being mesh plugged on the exhaust-gas downstream side, outlet-side cells neighboring the inlet-side cells and being mesh plugged on the exhaust-gas upstream side, and porous cellular partition walls demarcating the inlet-side cells and the outlet-side cells and having a large number of pores;
   an inlet-side catalytic layer being formed on a surface on a side of the inlet-side cells of the cellular partition walls;
   an outlet-side catalytic layer being formed on a surface on a side of the outlet-side cells of the cellular partition walls; and
   pore catalytic layer being formed on the pores within the cellular partition walls;
   the exhaust-gas converting filter being characterized in that:
   a noble metal is included in the outlet-side catalytic layer in a concentration that is a noble-metal concentration in the inlet-side catalytic layer or more; and
   an NO$_x$ storage material, which is selected from the group consisting of alkali metals and alkaline-earth metals, is included in the inlet-side catalytic layer, in the pore catalytic layer and in the outlet-side catalytic layer, and a content of the NO$_x$ storage material in the inlet-side catalytic layer is greater than that in the outlet-side catalytic layer.

2. The exhaust-gas converting filter as set forth in claim 1, wherein the content of said NO$_x$ storage material lowers from said inlet-side catalytic layer toward said pore catalytic layer and said outlet-side catalytic layer.

3. The exhaust-gas converting filter as set forth in claim 1 or 2, wherein:
   said inlet-side catalytic layer contains said NO$_x$ storage material in an amount of 0.2 mol-1.0 mol per 1-liter volume of the filter substrate; and
   said outlet-side catalytic layer contains said NO$_x$ storage material in an amount of 0.01 mol-0.3 mol per 1-liter volume of the filter substrate.

4. The exhaust-gas converting filter as set forth in claim 1 or 2, wherein the NO$_x$ storage material in said inlet-side catalytic layer includes potassium.

5. A production process for exhaust-gas converting filter, the production process being a process for producing either one of the exhaust-gas converting filters as set forth in claim 1 or 2, and the production process being characterized in that it includes:
   a coating-layer forming step of forming a coating layer, which comprises a porous oxide, onto said surface on a side of the inlet-side cells of the cellular partition walls, onto said surface on a side of the outlet-side cells of the cellular partition walls, and onto said pores;
   a noble-metal supporting step of supporting a noble metal onto the coating layer; and
   an NO$_x$-storage-material supporting step of supporting said NO$_x$ storage material onto the coating layer; and
   the NO$_x$-storage-material supporting step includes:
   a drying step of drying the coating layer after impregnating it with a solution in which ions of an element that is selected from the group consisting of alkali metals and alkaline-earth metals are dissolved; and
   the drying step being carried out by blowing hot air from said inlet-side cells toward said outlet-side cells.

6. The production process for exhaust-gas converting filter as set forth in claim 5, wherein a temperature of said hot air is 80° C.-130° C.

* * * * *